(12) United States Patent
Algüera et al.

(10) Patent No.: US 8,052,164 B2
(45) Date of Patent: Nov. 8, 2011

(54) CONNECTOR BRACKET FOR A TRAILER VEHICLE OF A TRACTOR TRAILER

(75) Inventors: José Manuel Algüera, Aschaffenburg (DE); Michael Eiermann, Pfungstadt (DE)

(73) Assignee: Jost-Werke GmbH, Neu-Isenburg (DE)

( * ) Notice: Subject to any disclaimer, the term of this patent is extended or adjusted under 35 U.S.C. 154(b) by 98 days.

(21) Appl. No.: 12/386,694

(22) Filed: Apr. 22, 2009

(65) Prior Publication Data
US 2009/0267321 A1 Oct. 29, 2009

(30) Foreign Application Priority Data
Apr. 23, 2008 (DE) .......................... 10 2008 001 349

(51) Int. Cl.
*B60D 1/62* (2006.01)
(52) U.S. Cl. ........................................ 280/422; 280/421
(58) Field of Classification Search .................. 280/420, 280/421, 422; 439/35
See application file for complete search history.

(56) References Cited

U.S. PATENT DOCUMENTS

| | | | | |
|---|---|---|---|---|
| 2,730,183 A | * | 1/1956 | Svoboda | 180/14.1 |
| 3,888,513 A | * | 6/1975 | Pilz et al. | 280/421 |
| 5,060,964 A | * | 10/1991 | Vick | 280/421 |
| 5,346,239 A | * | 9/1994 | Wohlhuter | 280/420 |
| 5,516,136 A | * | 5/1996 | Matthews et al. | 280/422 |
| 5,732,966 A | * | 3/1998 | Menard et al. | 280/422 |
| 7,106,182 B2 | * | 9/2006 | De Wilde | 340/431 |
| 2003/0178810 A1 | * | 9/2003 | Reiter et al. | 280/477 |
| 2009/0008903 A1 | | 1/2009 | Richter et al. | |
| 2010/0059967 A1 | * | 3/2010 | Alguera et al. | 280/420 |

FOREIGN PATENT DOCUMENTS

| | | |
|---|---|---|
| DE | 10 2004 024 33 A1 | 12/2005 |
| DE | 10 2006 033 899 A1 | 1/2008 |

* cited by examiner

*Primary Examiner* — Tony H. Winner
(74) *Attorney, Agent, or Firm* — Hudak, Shunk & Farine Co. LPA

(57) ABSTRACT

A connector bracket for a trailer vehicle of a tractor trailer, having a support frame which can swivel on a bearing about a coupling means and a connector arranged stationary on the support frame. A connector bracket on the trailer was needed that lessens the risk of damage to the connector from components of the tractor. A connector bracket is provided in which the connector is at least partly covered by the coupling in the lengthwise axis of the vehicle and a guide ramp is formed in front of the connector and tilting toward the connector at least during the coupling process.

20 Claims, 3 Drawing Sheets

CONNECTOR BRACKET FOR A TRAILER VEHICLE OF A TRACTOR TRAILER

FIELD OF THE INVENTION

The invention concerns a connector bracket for a trailer vehicle of a tractor trailer, comprising a support frame which can swivel on a bearing about a coupling means and a connector arranged stationary on the support frame, as well as a method of connecting a connector located on a trailer to a socket located on a tractor vehicle.

BACKGROUND OF THE INVENTION

Such connector brackets are used on semitrailer trucks, after a mechanical coupling of the semitrailer, to also connect the supply lines of the tractor vehicle to the semitrailer in largely automated fashion, so that the driver no longer has to climb between the tractor and the semitrailer and plug in the connection lines there, especially for the compressed air and electricity supply, by hand.

One prior art of this kind is disclosed by DE 2004 024 333 A1 with a plug-in coupling system, in which a plug-in device on the semitrailer with a connector arranged stationary therein is introduced into a socket arranged underneath the insertion opening. For this, the plug-in device on the semitrailer is brought to a level beneath the king pin and, when the tractor and semitrailer are mechanically coupled, and it is inserted into a socket arranged on the same level beneath the insertion opening.

In order to prevent premature wear and fouling, it is proposed in DE 10 2006 033 899 A1 to arrange the connector on the semitrailer on a closure plate which can travel vertically relative to the support frame, which moves the connector downward from the protecting support frame immediately prior to the insertion process, thereby making possible a coupling with the socket on the tractor.

In both known systems, the connector lies essentially or just prior to the connecting of the supply lines on a level beneath the king pin or beneath the insertion opening of the fifth wheel, in order to ensure that the king pin can move in and out of the fifth wheel. It has been found to be a drawback with this that when the fifth wheel has an especially low design height or the tractor has a very high rear axle the low lying connector can collide with components of the tractor.

Consequently, the problem on which the invention is based was to provide a connector bracket on the trailer that lessens the risk of damage to the connector from components of the tractor.

SUMMARY OF THE INVENTION

The problem is solved with a connector bracket in which the connector is at least partly covered by the coupling means in the lengthwise axis of the vehicle and a guide ramp is formed in front of the connector and tilting toward the connector at least during the coupling process. By a covering of the connector by the coupling means is meant a space projected into the lengthwise axis of the vehicle with the contours of the coupling means, for example, a king pin, which touches the cross sectional surface of the connector entirely or partly. A contacting of the connector with a socket on the tractor is possible if the vehicles being connected have an essentially horizontal approach on a straight line by means of the guide ramp. During the coupling process, the guide ramp first makes contact with the socket on the tractor and lifts the socket to the level of the connector as the vehicles continue to approach.

Advantageously, the connector is tilted downward with respect to the lengthwise axis of the vehicle. With a downward tilted connector, the guide ramp should likewise be tilted downward, in order to assure a feeding of the socket on the tractor. The shorter the distance from the coupling means, the more steeply the guide ramp can be tilted. The maximum tilt of the guide ramp should be chosen such that a resultant force constantly acts in the direction of the connector as the socket approaches.

Advisedly, at the time of the coupling the guide ramp is tilted more steeply than the insertion axis of the connector. In this way, the connector bracket can have the shortest possible design depth.

It has proven to be beneficial to have the connector arranged with its underside above or at the level of the underside of the king pin. In this way, the connector during the coupling process is situated in the protection of the king pin and less exposed to risk of damage.

According to one preferred embodiment, the support frame engages with a slotted link mounted so that it can move relative to it in the lengthwise axis of the vehicle. The slotted link is guided inside the support frame like a drawer. When no fifth wheel is present, the slotted link is found in a spring-loaded position with minimum spacing from the coupling element.

Advantageously, the slotted link has two wall segments oriented complementary to the insertion opening of a fifth wheel. These slanted wall segments bear with their full surface against the side walls of the fifth wheel in the region of the coupling horns and push the slotted link backward relative to the support frame as the tractor comes closer to the trailer. Thus, the distance increases between the slotted link and the coupling means.

Advisedly, a first crank is configured in the slotted link, which interacts with the guide ramp. Instead of a crank, a lever can also be provided, which is arranged as a connection element between guide ramp and slotted link and is activated by the slotted link.

The crank is preferably configured so that the guide ramp has a maximum tilt just before arriving at the socket. As the tractor's socket already lying on the guide ramp is moved forward, the movement of the crank can cause a lifting of the socket. This produces the advantage that the socket slides especially easily into the connector.

Preferably, a second crank or an additional lever is configured in the slotted link, which interacts with a plug-in front plate. The additional lever could then be arranged as a connection element between the front plate and the slotted link. The front plate in particular prevents dirt and moisture from getting in, so that the connector experiences much less wear and corrosion. The connector is freed from the front plate thanks to the movement of the slotted link during the coupling process.

The invention is also implemented on a plug-in coupling system, in which in addition to the connector bracket of the invention there is arranged a vertically pivoting socket underneath the insertion opening of a fifth wheel. When the connector is in the state of making contact with the socket, it should be spaced at a distance from the coupling horns of the fifth wheel in the lengthwise axis of the vehicle.

This is conveniently accomplished by placing the socket at the end of a support arm. Advantageously, the support arm has a swivel bearing at the end opposite the socket, which is arranged, for example, stationary on the understructure of a fifth wheel.

The axis about which the socket pivots preferably lies underneath the coupling means. This yields the benefit that the connector or the support arm, if present, does not collide with the underside of the coupling means or king pin.

Preferably, the socket constantly projects beyond the rear end of the fifth wheel. Thanks to this, the structural parts of the connector bracket are spaced at a great distance from the coupling of the tractor, so that the risk of a collision with structural parts of the tractor is further decreased, especially the fifth wheel mounted thereon or parts of the vehicle frame.

The problem is also solved by a method for connecting a connector situated on a trailer to a socket situated on a tractor vehicle, wherein the socket is forced by the relative movement of the vehicles from a position of rest onto a guide ramp arranged in front of the connector, lifted onto the guide ramp, and in its final position brought into active engagement with the connector, arranged stationary in a support frame.

According to an especially favorable step of the method, the lateral movement of the vehicles during the coupling process is transformed into an upward movement of the socket by a sliding or rolling of the socket following the course of the guide ramp.

Preferably, thanks to the support frame which can travel into the fifth wheel with form fitting, a lateral movement of a slotted link engaging therewith is transformed into a swivel movement of the guide ramp.

BRIEF DESCRIPTION OF THE DRAWINGS

For a better understanding, the invention will now be explained more closely by means of a total of six figures. These show.

DETAILED DESCRIPTION OF THE INVENTION

Figure 1:
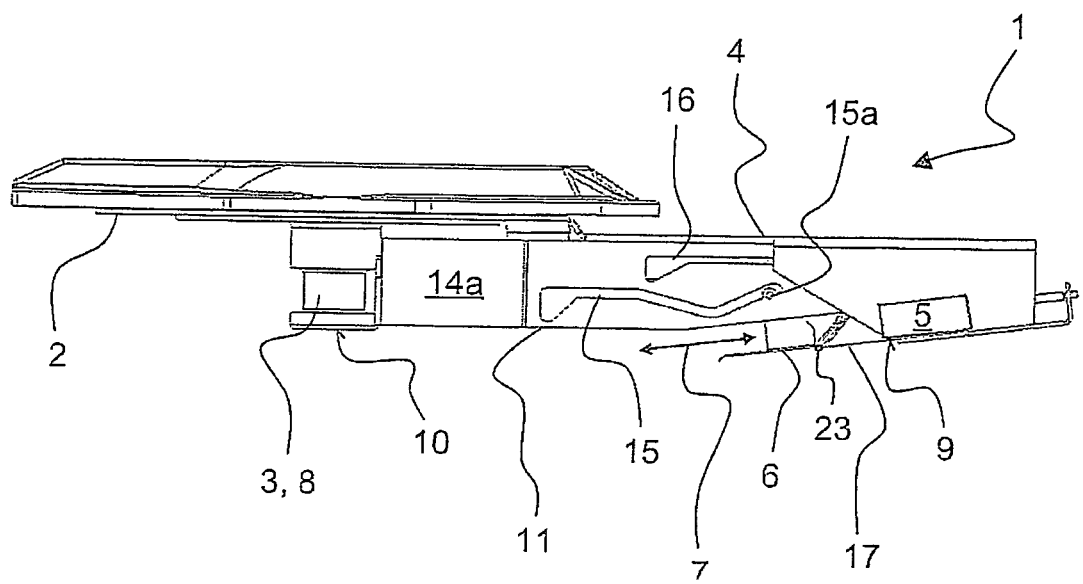
FIG. 1: a side view of a connector bracket.

FIG. 1 shows in a side view a connector bracket 1, which is mounted by means of a bearing 2 on the underside of a semitrailer, not shown more precisely, and which can swivel about a coupling means 3 in the form of a king pin 8. From the bearing 2, a support frame 4 runs in the radial direction to the coupling means 3.

Figure 2:
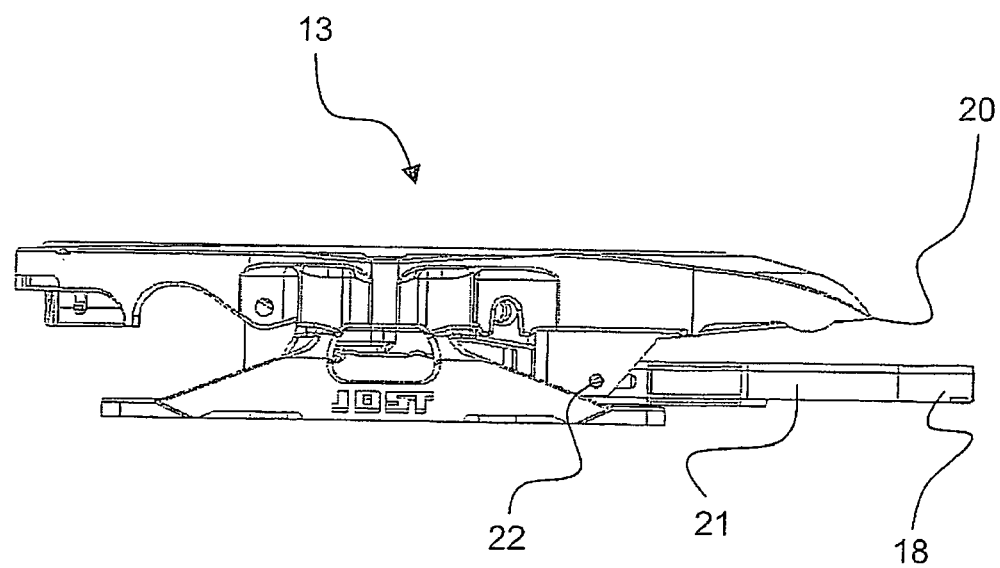
FIG. 2: a side view of a fifth wheel with socket arranged thereon.

The support frame 4 holds a connector 5 in a position stationary to it, which is brought into connection with a socket 18 located on a tractor vehicle when the semitrailer is coupled to it (see FIG. 2). In the vertical direction, the level of the underside 9 of the connector 5 corresponds to the level of the underside 10 of the king pin 8. Thanks to the stationary placement of the connector 5 on the support frame 4, the relation of levels of coupling means 3 and connector 5 remains constant regardless of the coupling status of the vehicles.

The connector 5 and the socket 18 can be used to realize both an electrical and a pneumatic or hydraulic connection of a trailer.

Furthermore, a guide ramp 6 is arranged on the support frame 4 in the insertion axis 7 in front of the connector 5, that is, between connector 5 and coupling means 8. The guide ramp 6 is placed such that it can swivel relative to the support frame 5 about a horizontal axis by means of a hinge 23.

The support frame 4, furthermore, serves as an abutment for a slotted link 11, which in the unloaded starting position without the presence of a fifth wheel 13 (see FIGS. 2 and 3) finds itself in a forward position with slight distance from the coupling means 3, thanks to spring elements not further shown. When the wall segments 14*a*, 14*b*, of which only the front wall segment 14*a* is visible in the drawing of FIG. 1, impinge on the side wall segments of the insertion opening 12 of the fifth wheel 13, the slotted link 11 is pushed away from the coupling means 3 against the tension of the spring element (not shown) and slides backward through the support frame 4.

The slotted link 11 has a first crank 15, with a segment which at first moves horizontally away from the coupling means 3 and an adjoining V-shaped segment. The crank 15 engages with a control cam 15*a*, which is joined stationary to the guide ramp 6. During the coupling of the trailer, the slotted link 11 moves away in a lateral movement from the coupling means 3, so that the guide ramp 6 plus control cam 15*a*, fixed in the lateral direction via the support frame 4, follows the course of the first crank 15.

A second crank 16 is formed in the slotted link 11, which interacts with a plug-in front plate 17 arranged in front of the connector 5.

FIG. 2 shows, likewise in a side view, the socket 18 fastened to the fifth wheel 13. The socket 18 is fashioned at the end of a support arm 21. At the end of the support arm 21 opposite the socket 18, the arm is fastened by means of a swivel bearing 22 to the fifth wheel 13. The swivel bearing 22 has a horizontally extending swivel axis, which is oriented parallel to the swivel axis of the hinge 23.

Without the presence of the socket 1 at the semitrailer, the support arm 21 is oriented basically parallel to the top side of the fifth wheel 13, that is, horizontally backward. The length of the support arm 21 is such that the socket 18 projects beyond the rear end 20 of the fifth wheel 13 and thus is sufficiently far from structural parts of the tractor with which it might collide under certain conditions.

Figure 3:
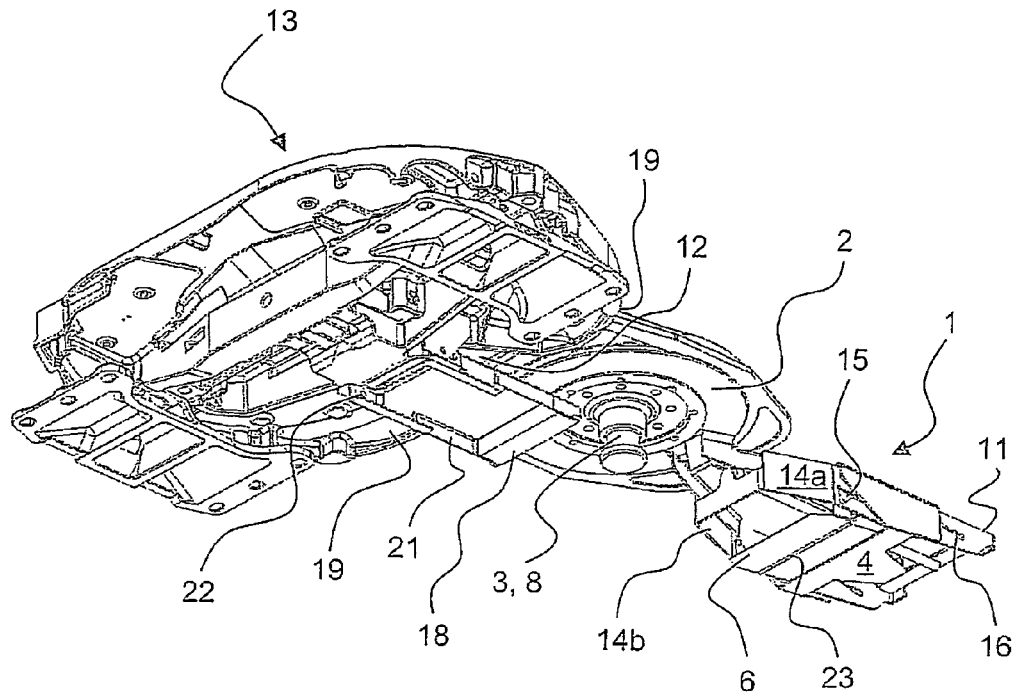
FIG. 3: a perspective bottom view of a plug-in coupling system arranged on a fifth wheel and a king pin.

FIG. 3 illustrates in a perspective bottom view the spatial position of a fifth wheel 13 having come near the king pin 8 plus connector bracket 1, with a socket 18 located on it. For the coupling, the tractor vehicle is moved with the fifth wheel 13 in the direction of the king pin 8 until the latter, guided by the coupling horns 8 in the insertion opening 12 reaches its end position in a central location and is connected by form fitting to the fifth wheel 13. The installation position of the socket 18 is arranged so far beneath the insertion opening 12 that an overshooting by the king pin 8 is not possible.

In the representation of FIG. 3, the slanted position of the wall segments 14*a*, 14*b* is especially well seen, being fashioned complementary to the wedge-shaped insertion opening 12 of the fifth wheel 13.

Figure 4:
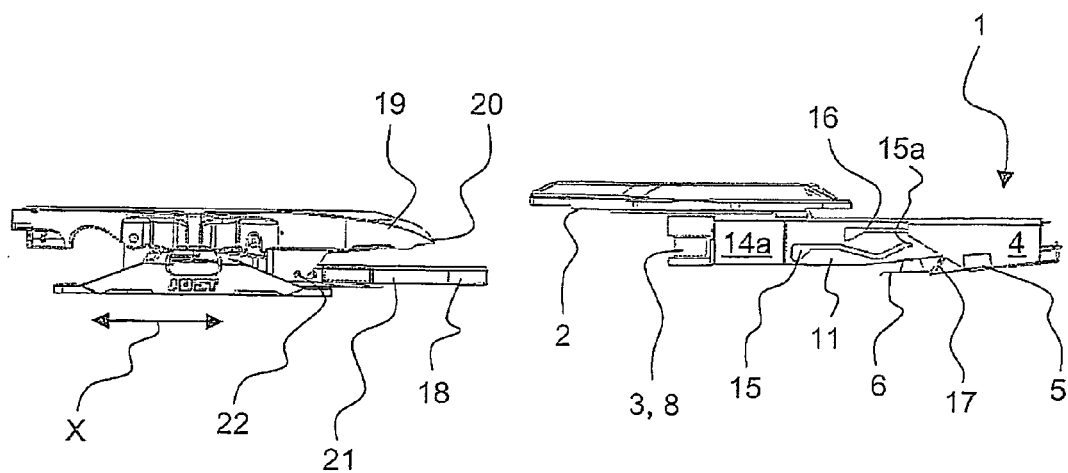
FIG. 4: a side view of the plug-in coupling system on a tractor trailer with the semitrailer uncoupled.
Figure 5:
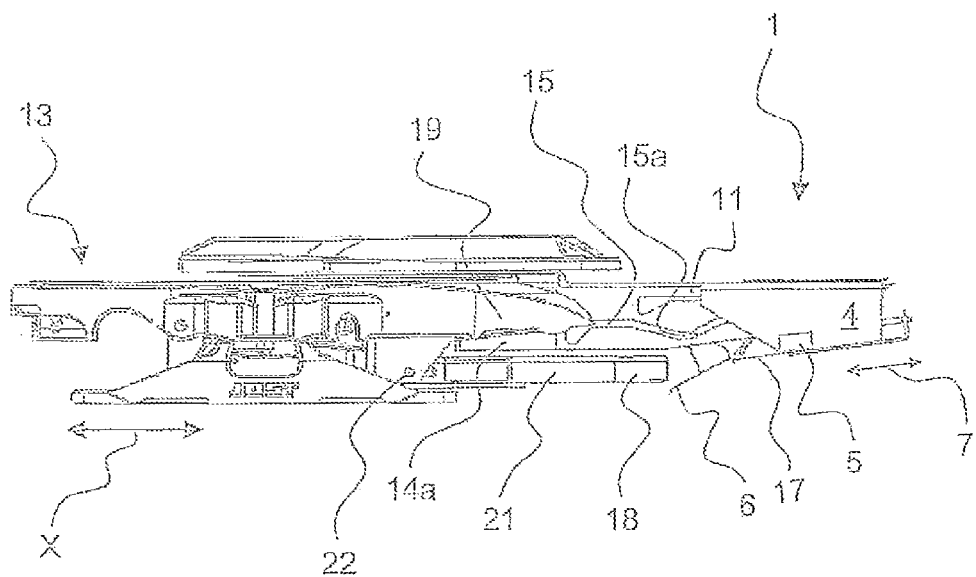
FIG. 5: a side view per FIG. 4 during the coupling process.
Figure 6:
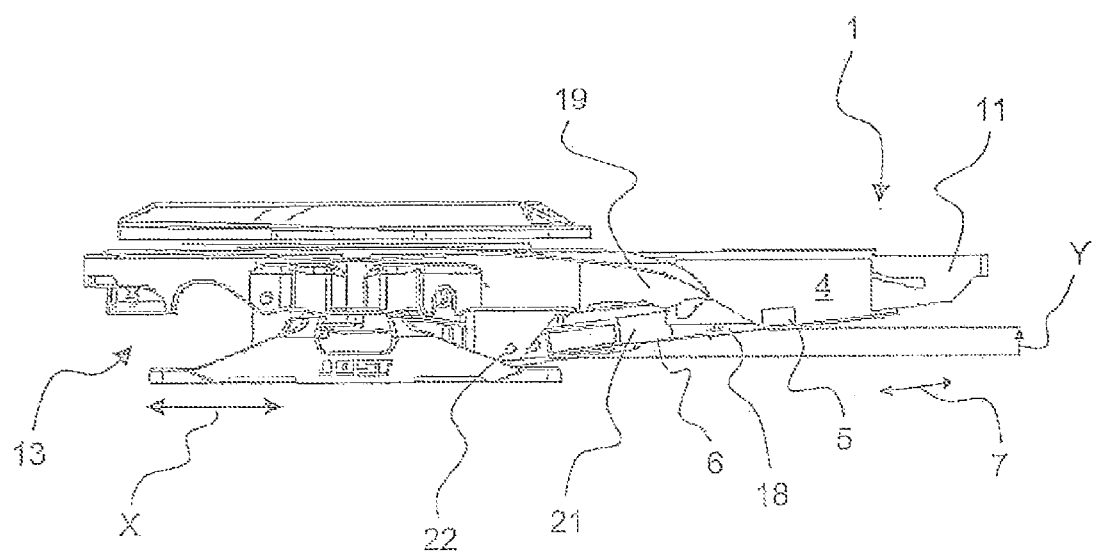
FIG. 6: a side view per FIG. 4 or 5 in the coupled state.

FIGS. 4 to 6 show various consecutive coupling conditions and the resulting functioning of the connector bracket 1 or of the plug-in coupling system comprising a connector bracket 1 and a socket 18.

A connector bracket 1 at a distance from the fifth wheel 13 is shown in FIG. 4. In this condition, the slotted link 11 is in a position near the king pin 8, relative to the support frame 4; the control cam 15*a* of the guide ramp 6 is at the distant end (relative to the king pin 8) of the first crank 15 within the V-shaped segment. Without contact between the wall segments 14a, 14b and the fifth wheel 13, the guide ramp 6 is swiveled into a closed position and closes the support frame 4 with the connector 5 inside it from the bottom.

FIG. 5 shows vehicles which have come together in the lateral direction of movement X, the king pin 8 already having entered the insertion opening 12 of the fifth wheel 13 and therefore is no longer visible. The wall segments 14a, 14b (see FIG. 3) impinge against the facing sides of the coupling horns 19 and have forced the slotted link 11 backward relative to the support frame 4. In this way, the control cam 15a has moved within the first crank 15 to the lowermost point of the V-shaped segment and forces the guide ramp 6 into a position swiveled as much as possible downward.

The maximum downward swiveled position of the guide ramp 6 extends to below the level of the socket 18, so that the socket 18 impinges on the guide ramp 6 during further approach in the lateral direction of movement X. Just before the socket 18 impinges on the guide ramp 6, the king pin 8 has already moved across the swivel bearing 22. This arrangement prevents a collision between the king pin 8 and the socket 18 moving upward on the guide ramp 8 or the support arm 21.

FIG. 6 shows the king pin 8 fully inserted into the fifth wheel 13. The socket 18 has moved on the guide ramp 6 in the direction of the connector 5 and has performed an upward movement Y by the time final contact is made. This upward movement Y is possible especially preferably by the swivel bearing 22 of the support arm 21. Basically, an elastic bending support arm 21 could also be used instead of a swiveling support arm 21.

The upward movement Y of the socket 18 is supported by the upwardly swinging guide ramp 6. Thanks to the complete insertion of the king pin 8 into the fifth wheel 13 along the lateral direction of movement X, the support frame 4 is pulled forward relative to the slotted link 11, which is held stationary in the insertion opening 12, so that the control cam 15a moves into the ascending part of the V-shaped segment and from there into the horizontally extending segment of the first crank 15. The resulting upward movement of the guide ramp 6 lifts up the socket 18 and supports a plugging of the socket into the connector 5.

LIST OF REFERENCE SYMBOLS 1 connector bracket
2 bearing
3 coupling means
5 support frame
6 connector
6 guide ramp
7 insertion axis
8 king pin
9 underside of connector
10 underside of king pin
11 slotted link
12 insertion opening
13 fifth wheel
14a, b wall segments
15 first crank
15a control cam
16 second crank
17 plug-in front plate
18 socket
19 coupling horns of fifth wheel
20 rear end of fifth wheel
21 support arm
22 swivel bearing
22 hinge
X lateral direction of movement
Y upward movement

What is claimed is:

1. A connector bracket for a trailer vehicle of a tractor trailer, comprising: a support frame which can swivel on a bearing about a coupling means and a connector arranged stationary on the support frame, wherein the connector is always at least partly covered by the coupling means in a lengthwise axis of the vehicle and a guide ramp is formed in front of the connector and tilting toward the connector at least during a coupling process.

2. The connector bracket per claim 1, wherein the connector is tilted downward with respect to the lengthwise axis of the vehicle.

3. The connector bracket per claim 1, wherein the guide ramp is tilted more steeply than an insertion axis of the connector.

4. The connector bracket per claim 1, wherein the coupling means is a king pin of a semitrailer.

5. The connector bracket per claim 4, wherein the connector is arranged with an underside of the connector above or at a level of the underside of the king pin.

6. The connector bracket per claim 1, wherein the support frame engages with a slotted link mounted so that the slotted link can move relative to the support frame in the lengthwise axis of the vehicle.

7. The connector bracket per claim 6, wherein the slotted link has two wall segments oriented complementary to an insertion opening of a fifth wheel.

8. The connector bracket per claim 6, wherein a first crank is configured in the slotted link, which interacts with the guide ramp.

9. The connector bracket per claim 6, wherein a second crank is configured in the slotted link, which interacts with a plug-in front plate.

10. A plug-in coupling system with a connector bracket arranged on the trailer vehicle according to claim 1 and a socket which can be arranged underneath an insertion opening of a fifth wheel, wherein the socket is secured vertically pivotable, wherein when the connector is in the state of making contact with the socket, the connector is arranged at a distance from the coupling horns of the fifth wheel in the lengthwise axis of the vehicle.

11. The plug-in coupling system per claim 10, wherein the socket constantly projects beyond a rear end of the fifth wheel.

12. The plug-in coupling system per claim 10, wherein the socket is secured at an end of a support arm.

13. The plug-in coupling system per claim 12, wherein the support arm has a swivel bearing at the end opposite the socket.

14. The plug-in coupling system per claim 10, wherein socket constantly projects beyond a rear end of the fifth wheel, wherein the socket is secured at an end of a support arm, and wherein the support arm has a swivel bearing at the end opposite the socket.

15. The connector bracket per claim 1, wherein the connector is tilted downward with respect to the lengthwise axis of the vehicle, wherein the guide ramp is tilted more steeply than an insertion axis of the connector, wherein the coupling means is a king pin of a semitrailer, and wherein the connector is arranged with an underside of the connector above or at a level of the underside of the king pin.

16. The connector bracket per claim 15, wherein the support frame engages with a slotted link mounted so that the slotted link can move relative to the support frame in the lengthwise axis of the vehicle, wherein the slotted link has two wall segments oriented complementary to an insertion opening of a fifth wheel, wherein a first crank is configured in the slotted link, which interacts with the guide ramp, and wherein a second crank is configured in the slotted link, which interacts with a plug-in front plate.

17. A method for connecting a connector situated on a trailer to a socket situated on a tractor vehicle, comprising the steps of: forcing the socket by the relative movement of the vehicles from a position of rest onto a guide ramp arranged in front of the connector, by lifting onto the guide ramp, and in a final position bringing the socket into active engagement with the connector, arranged stationary in a support frame.

18. A method per claim 17, wherein the lateral movement (X) of the vehicles during the coupling process is transformed into an upward movement (Y) of the socket, whereby the socket follows the course of the guide ramp.

19. A method per claim 18, wherein due to the support frame which can travel into the fifth wheel with form fitting, a lateral movement (X) of a slotted link engaging therewith is transformed into a swivel movement of the guide ramp.

20. A method per claim 17, wherein due to the support frame which can travel into the fifth wheel with form fitting, a lateral movement (X) of a slotted link engaging therewith is transformed into a swivel movement of the guide ramp.

* * * * *